(12) United States Patent
Josephson et al.

(10) Patent No.: US 9,032,990 B2
(45) Date of Patent: May 19, 2015

(54) CHEMICAL DELIVERY SYSTEM

(75) Inventors: Marcel E. Josephson, San Jose, CA (US); David K. Carlson, San Jose, CA (US); Steve Jumper, Dublin, CA (US); Errol Antonio C. Sanchez, Tracy, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 636 days.

(21) Appl. No.: 13/441,371

(22) Filed: Apr. 6, 2012

(65) Prior Publication Data

US 2012/0266984 A1    Oct. 25, 2012

Related U.S. Application Data

(60) Provisional application No. 61/478,755, filed on Apr. 25, 2011.

(51) Int. Cl.
*F16L 35/00*    (2006.01)
*G05D 7/06*    (2006.01)

(52) U.S. Cl.
CPC .................................. *G05D 7/0641* (2013.01)

(58) Field of Classification Search
USPC ................... 137/240, 334, 377; 118/715, 719
See application file for complete search history.

(56) References Cited

U.S. PATENT DOCUMENTS

| | | | |
|---|---|---|---|
| 4,802,502 A * | 2/1989 | Williams | 137/382 |
| 6,119,715 A * | 9/2000 | Russell | 137/240 |
| 6,406,519 B1 | 6/2002 | Tom et al. | |
| 6,436,194 B1 * | 8/2002 | Carlson et al. | 118/720 |
| 6,637,475 B2 | 10/2003 | Noah et al. | |
| 7,748,400 B2 | 7/2010 | Nakashima et al. | |

FOREIGN PATENT DOCUMENTS

JP    11-009987 A    1/1999

OTHER PUBLICATIONS

Search Report and Written Opinion mailed Nov. 28, 2012 for PCT Application No. PCT/US2012/034375.

* cited by examiner

*Primary Examiner* — Kevin Murphy
(74) *Attorney, Agent, or Firm* — Moser Taboada; Alan Taboada

(57) ABSTRACT

Embodiments of chemical delivery systems disclosed herein may include an enclosure; a first compartment disposed within the enclosure and having a plurality of first conduits to carry a first set of chemical species, the first compartment further having a first draw opening and a first exhaust opening to facilitate flow of a purge gas through the first compartment; and a second compartment disposed within the enclosure and having a plurality of second conduits to carry a second set of chemical species, the second compartment further having a second draw opening and a second exhaust opening to facilitate flow of the purge gas through the second compartment, wherein the first set of chemical species is different than the second set of chemical species, and wherein a draw velocity of the purge gas through the second compartment is higher than the draw velocity of the purge gas through the first compartment.

20 Claims, 3 Drawing Sheets

CHEMICAL DELIVERY SYSTEM

CROSS-REFERENCE TO RELATED APPLICATIONS

This application claims benefit of U.S. provisional patent application Ser. No. 61/478,755, filed Apr. 25, 2011, which is herein incorporated by reference.

FIELD

Embodiments of the present invention generally relate to chemical delivery systems for use in, for example, semiconductor processing.

BACKGROUND

Chemical delivery systems (CDSs) including a gas cabinet, enclosure, and the like can be used to house and/or route one or more chemical species from a chemical species source to a process chamber, for example, for use in processing a substrate disposed in the process chamber, such as to deposit a layer of material on the substrate. For safety reasons, CDSs are maintained under a continuous purge flow to sweep any leaked species being routed through the CDS to appropriate handling equipment, such as an abatement system. However, the draw requirements to maintain a purge flow can be very high, for example, to ensure that the CDS can pass a tracer gas test for each chemical species. Moreover, if one or more of the chemical species passing through the CDS are toxic, an even more stringent purge standards apply than for non-toxic chemical species. Such high purge flows may be difficult and costly to maintain in terms of both hardware required to maintain the desired purge flow as well as due to the cost of the purge gas itself.

Thus, the inventors have provided improved designs for chemical delivery systems herein.

SUMMARY

Embodiments of a chemical delivery system are disclosed herein. In some embodiments, a chemical delivery system may include an enclosure; a first compartment disposed within the enclosure and having a plurality of first conduits to carry a first set of chemical species, the first compartment further having a first draw opening and a first exhaust opening to facilitate flow of a purge gas through the first compartment; and a second compartment disposed within the enclosure and having a plurality of second conduits to carry a second set of chemical species, the second compartment further having a second draw opening and a second exhaust opening to facilitate flow of the purge gas through the second compartment, wherein the first set of chemical species is different than the second set of chemical species, and wherein a draw velocity of the purge gas through the second compartment is higher than the draw velocity of the purge gas through the first compartment.

In some embodiments, the second exhaust opening may have a smaller cross sectional area than the first exhaust opening.

In some embodiments, the enclosure further includes a third compartment to receive at least some chemical species for the first or the second sets from a location external to the enclosure and having at least some of the plurality of first and second conduits originating in the third compartment to carry the at least some chemical species respectively to the first and second compartments.

In some embodiments, a chemical delivery system may include an enclosure; a first compartment disposed within the enclosure and having a plurality of first conduits to carry a first set of chemical species, the first compartment further having a first draw opening and a first exhaust opening to facilitate flow of a purge gas through the first compartment; a second compartment disposed within the enclosure and having a plurality of second conduits to carry a second set of chemical species, the second compartment further having a second draw opening and a second exhaust opening to facilitate flow of the purge gas through the second compartment, wherein the first set of chemical species is different than the second set of chemical species; and a third compartment disposed within the enclosure and having at least some of the plurality of first conduits and at least some of the plurality of second conduits originating in the third compartment and having a fitting to couple the originating at least some first and second conduits to an external supply of at least some of the chemical species from the first and second sets, wherein the third compartment further includes a third draw opening and a third exhaust opening to facilitate flow of the purge gas through the third compartment, and wherein draw velocities of the purge gas through the second compartment and the third compartment are higher than the draw velocity of the purge gas through the first compartment.

Other and further embodiments of the present invention are described below.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

Figure 1:
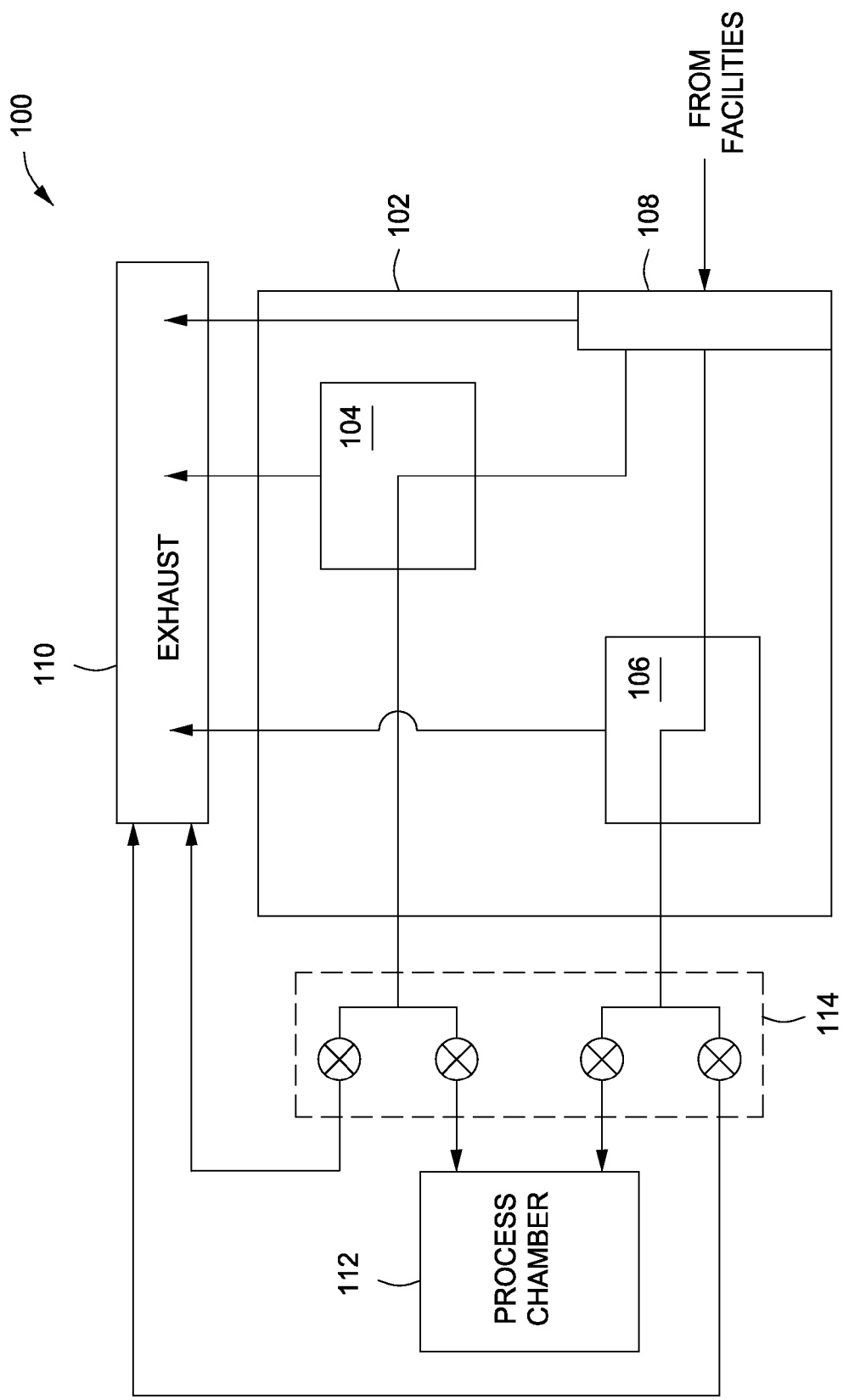
FIG. 1 depicts a schematic view of a chemical delivery system in accordance with some embodiments of the present invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of a chemical delivery system (CDS) are disclosed herein. The CDS may advantageously meet the desired safety standards required for processing with various toxic and/or non-toxic chemical species while also limiting the total exhaust draw necessary to meet such safety standards.

Moreover, embodiments of the CDS disclosed herein may advantageously provide for chemical delivery in III-V epitaxial deposition processes. Such processes require multiple gas, liquid, and solid sources to be provided by the CDS.

Some of these sources are toxic and pyrophoric (e.g., arsine, phosphine, silane). The sheer number of such sources and the consequent large volume enclosure present a challenge to acceptable purges and exhaust draw as to ensure minimum face velocity across seals in the event of a leak. Leak detection sensitivity also becomes an issue. In addition, embodiments of the CDS may provide for pressure balancing between multiple injection manifolds, controlled reactant path lengths, and fast switching to facilitate improved processing, such as depth composition profile control. In some embodiments, liquid/solid ampoule mounting and positioning and adequate space for lock-out tag-out fixtures may be provided for ease of serviceability.

FIG. 1 depicts a schematic view of a CDS 100 in accordance with some embodiments of the present invention. The CDS 100 comprises an enclosure 102 that contains two or more compartments. In FIG. 1, a first compartment 104, a second compartment 106, and a third compartment 108 are shown. Each compartment 104, 106, 108, may be configured to have an independent flow rate, or draw, of a purge gas provided through the CDS 100. For example, each compartment 104, 106, 108 may be coupled to an exhaust system 110 that pulls a gas (such as room air or some other purge gas) through the enclosure 102, including through each compartment 104, 106, 108. The volume of the respective compartments in combination with the exhaust pressure may provide independent control over the purge draw through the compartment. In addition, further control may be provided by independently controlling the pressure at the exhaust of the particular compartment (or group of compartments), and/or by controlling the size of an exhaust opening provided between the compartment and the exhaust system 110.

The gas sources within the CDS 100 may be grouped into pallets, not just in a manner that is logically consistent with the process application and source types, but more importantly to allow for compartmentalization within the enclosure 102. Thus, high toxicity gases (such as arsine, phosphine, and their organo-derivative liquids) may be separated into a common compartment (e.g., the first compartment 104). The smaller volume of the compartment as compared to the total volume of the enclosure 102 facilitates providing a greater flow of purge gas through the compartment without a concomitant larger flow rate of the purge gas through the other compartments or the enclosure 102 itself. This maximizes exhaust draw and leak detection sensitivity for the gases grouped within the compartment while reducing the outrageously large total exhaust draw otherwise needed for the CDS 100, for example, to pass a tracer gas test. The rest of the gas sources that require only minimal exhaust draw may be laid out in the larger volume of the enclosure 102 in a manner that meets the source delivery requirements (such as for film composition control and purity).

For example, in some embodiments, the first compartment 104 may include one or more gas sources having a high toxicity, or a higher toxicity than remaining gas sources disposed in or flowing through the CDS 100. The remaining gas sources disposed within or flowing through the CDS 100 (e.g., the low toxicity, or lesser toxic than the high toxicity gases) may be grouped within the second compartment 106. It is contemplated that the second compartment 106 may merely be the remainder of the inner volume of the enclosure 102 not occupied by other compartments (such as the first compartment 104 and the third compartment 108).

The tie-in points from the facilities (e.g., external gas supplies) may be provided, for example, in the third compartment 108. The third compartment 108 may be configured in a relatively small volume, or raceway, that allows for fast purge flow across the seals and ease of installation of lock-out tag-out fixtures onto facilities supply manual valves.

The CDS 100 may be coupled to a process chamber 112 by a plurality of conduits arranged, for example, into a manifold 114. The manifold 114 comprises a plurality of conduits and valves configured to facilitate selectively delivering process gases, or combinations of process gases from the CDS 100 to the process chamber 112. The manifold 114 may also be configured to switch delivery of the process gases from the process chamber 112 to the exhaust system 110 to allow for fast switching between supplying different process gases to the process chamber 112 without incurring (or while minimizing any) pressure perturbations in the gas supply to the process chamber 112 that may negatively impact processing (such as deposition uniformity).

Figure 2:
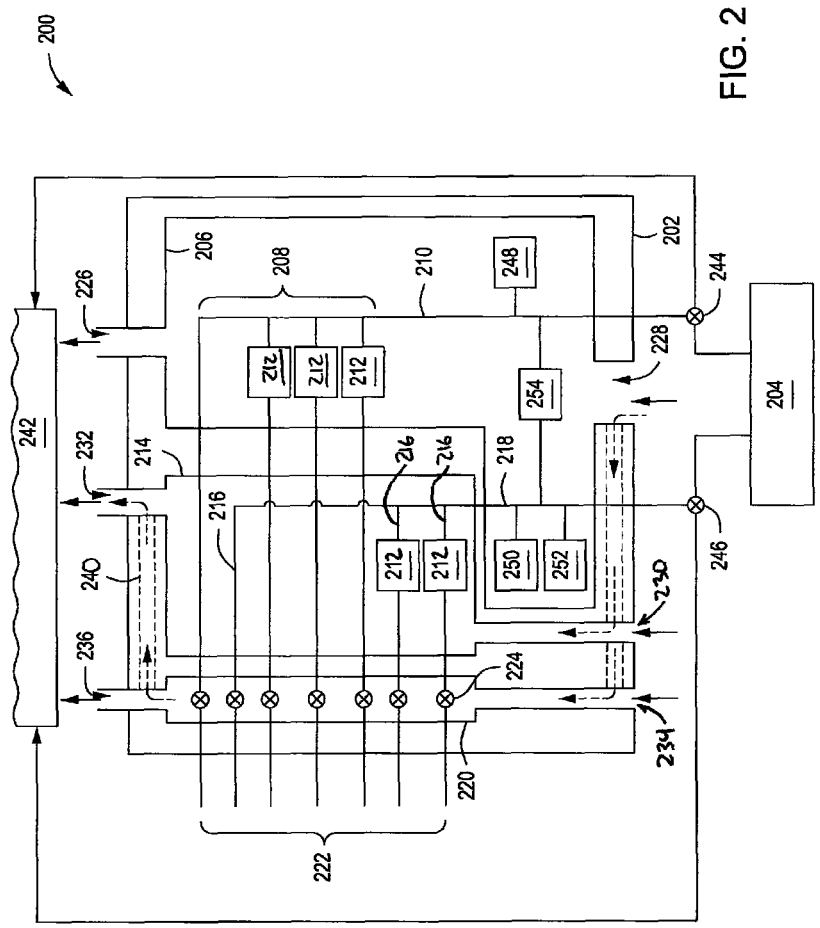
FIG. 2 depicts a more detailed schematic view of a chemical delivery system in accordance with some embodiments of the present invention.

The specific configuration of process gas grouping, compartmentalization, and other features of the CDS may vary depending, for example, upon the process to be performed in the process chamber 112. For example, FIG. 2 depicts a CDS 200 in accordance with some embodiments of the present invention. Embodiments of the CDS 200 may provide the same features and benefits as the CDS 100 described above. The chemical delivery system includes an enclosure 202. The enclosure 202 may serve to house and/or route chemical species. For example, the chemical species may be routed through the enclosure 202 from an external source, such as a central facilities source or any suitable gas source to a process apparatus, such as a process chamber 204. Alternatively or in combination, the chemical species may be housed in the enclosure 202, such as in a liquid and/or solid state, which may be vaporized and/or sublimed (discussed below) and routed to a process apparatus, such as the process chamber 204.

The enclosure 202 may be made of any suitable materials compatible with the chemical species. Such materials may include stainless steel, enamel painted steel, or the like. The enclosure 202 may be fully enclosed, for example sealed with respect to the surrounding environment, where any elements such as conduits or the like, enter the enclosure 202 through sealed junctions or the like. The enclosure 202 may be partially enclosed, for example having openings or the like that expose at least portions of an interior of the enclosure 202 to the surrounding environment. Elements such as conduits or the like can enter and exit the enclosure 202 through such openings. In some embodiments, such openings may be utilized to draw in atmosphere from the surrounding environment for use as a purge gas through the enclosure 202 as discussed below.

The enclosure 202 may include a first compartment 206 disposed within the enclosure 202. In some embodiments, the first compartment 206 may include a plurality of first conduits 208 to carry a first set of chemical species. The plurality of first conduits 208 may originate elsewhere in the enclosure 202, such as in a third compartment 220 (discussed below) and carry at least some of the first set of chemical species to the first compartment 206. In the first compartment 206, each of the first conduits 208 maybe coupled to a first fluid line 210 via one or more devices 212. The devices 212 may include one or more of a metering device, such as a mass flow controller or the like, a liquid gas injection apparatus, or an ampoule including one or more chemical species from the first set in a liquid or solid state. Embodiments of the one or more devices 212 are discussed below and illustrated in FIGS. 3A-C.

The first set of chemical species may be delivered to the first compartment 206 via the plurality of first conduits 208, and/or the first set of chemical species can originate in the first compartment 206. For example, in some embodiments, one of the first set of chemical species may be disposed in a liquid or solid state in the one or more devices 212, such as an ampoule, and another of the first set of chemical species, such as a carrier gas, provided by one of the plurality of first conduits 208 may pass over the ampoule drawing sublimed or vaporized chemical species from the ampoule into the first conduit 208 and towards the first fluid line 210. Embodiments pertaining to an ampoule are discussed below in more detail with respect to FIG. 3C. The first set of chemical species may include chemical species in solid, liquid or gaseous states. In some embodiments, the first set of chemical species may include a carrier gas, such as hydrogen ($H_2$), nitrogen ($N_2$), argon (Ar), helium (He), or the like. In some embodiments, the first set of chemical species may include one or more Group III elements. For example, chemical species comprising Group III elements may include trimethyl indium (($CH_3)_3$I) (TMI), trimethyl aluminum ((($CH_3)_3$Al) (TMA), trimethyl gallium (($CH_3)_3$Ga) (TMG), triethyl gallium (($CH_3CH_2)_3$Ga), or the like. In some embodiments, the first set of chemical species may be substantially non-toxic. Accordingly, the first compartment 206 may require a lower draw velocity of a purge gas through the first compartment 206 than that through second and/or third compartments 214, 220 as discussed below.

The enclosure 202 may include a second compartment 214 disposed within the enclosure 202. In some embodiments, and for example as illustrated in FIG. 2, the second compartment 214 may be isolated with respect to the first compartment 206. However, this is merely an exemplary illustration and other embodiments are possible. For example, the first and second compartments 206, 214 may be open to each other (not shown). In some embodiments, the second compartment 214 may include a plurality of second conduits 216 to carry a second set of chemical species. The plurality of second conduits 216 may originate elsewhere in the enclosure 202, such as in a third compartment 220 (discussed below) and carry at least some of the second set of chemical species to the second compartment 214. In the second compartment 214, each of the second conduits 216 maybe coupled to a second fluid line 218 via the one or more devices 212.

The second set of chemical species may be delivered to the second compartment 214 via the plurality of second conduits 216, and/or the second set of chemical species can originate in the second compartment 214 in a substantially similar manner to embodiments discussed above regarding the first set of chemical species. The second set of chemical species may include chemical species in solid, liquid or gaseous states. In some embodiments, the second set of chemical species may include a carrier gas, such as hydrogen ($H_2$), nitrogen ($N_2$), argon (Ar), helium (He), or the like. In some embodiments, the second set of chemical species may include one or more Group V elements. For example, chemical species comprising Group V elements may include phosphine ($PH_3$), arsine ($AsH_3$), tertiarybutyl phosphine (($CH_3)_3C)PH_2$), tertiarybutyl arsine (($CH_3)_3C)AsH_2$), trimethyl antimony (($CH_3)_3Sb$), or the like. In some embodiments, the second set of chemical species may be different from the first set of chemical species. In some embodiments, the second set of chemical species may be toxic. Accordingly, the second compartment 214 may require a higher draw velocity of a purge gas through the second compartment 214 than that through the first compartment 206 as discussed below.

The enclosure 202 may include a third compartment 220. The third compartment 220 may receive at least some chemical species from the first or second sets of chemical species from a location external to the enclosure 202. For example, the at least some chemical species may be provided to the third compartment by one or more gases sources, for example from central facility sources or from gas sources specifically provided for use with the process chamber 202. For example, the at least some chemical species may be provided to the third compartment 220 by a plurality of third conduits 222. Each third conduit may enter the enclosure 202 from an external location and carry a chemical species from the first or second sets. At least some of the first and second conduits 208, 216 may be coupled in the third compartment 220 to other conduits disposed primarily external to the enclosure to carry the at least some chemical species respectively to the first and second compartments 206, 214. Similar to the first and second compartments 206, 214, the third compartment 220 can be an isolated compartment, or a predominantly isolated compartment that is partially open to the first and second compartments 206, 214.

The third compartment 220 may include a plurality of joints 224 disposed within the third compartment 220. Each joint 224 may couple one of the plurality of third conduits 222 to a corresponding one of the plurality of first and second conduits 208, 216. Each joint 224 may be one or more of a valve, connector, or the like.

The first, second and third compartments 206, 214, 220 may be maintained under a continuous purge gas flow during operation of the process chamber 202 and/or at all times. For example, the purge gas may be a designated inert gas, such as Ar, He or the like fed into each of the first, second, and third compartments 206, 214, 220. Alternatively or in combination, the purge gas may be the surrounding atmosphere, drawn into the enclosure 202 and through the compartments 206, 214, 220 by an exhaust system or the like coupled to the compartments 206, 214, 220.

Each of the first, second and third compartments may have separate exhaust openings and draw openings for the inlet and outlet of the purge gas through each of the compartments. Alternatively, the one or more of the exhaust openings and/or draw openings may be shared between compartments. For example, in some embodiments, the first compartment 206 may include a first exhaust opening 226 to exhaust a purge gas flowing through the first compartment 206. In some embodiments, the first compartment 206 may include a first draw opening 228 to draw the purge gas into the first compartment 206. In some embodiments, the second compartment 214 may include a second exhaust opening 232 to exhaust the purge gas flowing through the second compartment 214. In some embodiments, the second compartment 214 may include a second draw opening 230 to draw the purge gas into the second compartment 214. In some embodiments, the third compartment 220 may include a third exhaust opening 236 to exhaust the purge gas flowing through the third compartment 220. In some embodiments, the third compartment 220 may include a third draw opening 234 to draw the purge gas into the third compartment 220.

Alternative embodiments of openings for inlet and outlet of the purge gas are possible for the first, second, and third compartments 206, 214, 220. For example, the first, second and third draw openings 228, 230, and 234 may be replaced by a single draw opening, for example such as the first draw opening 228 having a conduit 238 coupling the first draw opening 228 to the second and third compartments 214, 220. Alternatively, bottom portions (not shown) of the enclosure 202 and each of the first, second, and third compartments 206, 214, 220 may be open and/or having openings disposed proximate thereto, for example, such as in side portions of the enclosure 202 or the like for drawing in the purge gas. It is contemplated that any one or more of the compartments may have multiple draw openings and/or exhaust openings.

Similarly, in some embodiments, the second and third gas compartments 214, 220 may have substantially similar purge gas draw requirements. Accordingly, the second and third exhaust openings 232, 236 may be a single exhaust opening, for example, illustrated as a conduit 240 coupling the third compartment 220 to the second exhaust opening 232. However, this is merely an illustratively example, and other variants of a single exhaust opening for the second and third gas compartments 214, 220 may be possible.

Each of the first, second and third compartments 206, 214, 220 may have varying purge gas draw requirements, for example, to pass a gas tracer test or the like. For example, the first compartment 206 which routes the first set of chemical species may have a lower purge gas draw requirement than the second or third compartments 214, 220. In some embodiments, the first compartment 206 may have a lower purge gas draw requirement when the first set of chemical species are substantially non-toxic materials, such as materials including Group III elements.

For example, the second compartment 214 which routes the second set of chemical species and/or the third compartment 220 which routes both the first and second set of chemical species may have higher purge gas draw requirements than the first compartment 206. In some embodiments, the second and/or the third compartments 214, 220 may have a higher purge gas draw requirement when the second set of chemical species include toxic materials, such as materials including Group V elements. In some embodiments, the draw velocity of the purge gas through the second compartment 214 is higher than the draw velocity of the purge gas through the first compartment 206. In some embodiments, the draw velocity of the purge gas through the third compartment 220 is higher than the draw velocity of the purge gas through the first compartment 206.

Variation of the draw velocity of the purge gas in each compartment may be achieved by one or more embodiments of the present invention. For example, each compartment may have a different volume. In addition, each exhaust outlet 226, 232, 236 may be coupled to a different exhaust system (not shown), where each exhaust system has a different exhaust rate. Alternatively, each exhaust outlet 226, 232, 236 may be coupled to the same exhaust system 242. In some embodiments, variation of draw velocity of the purge gas in each compartment 206, 214, 220 may be controlled by controlling the diameter of each exhaust opening 226, 232, 236. For example, in some embodiments, to achieve a higher draw velocity in the second compartment 214, the second exhaust opening 232 may be smaller than the first exhaust opening 226 of the first compartment 206. Similarly, in some embodiments, to achieve a higher draw velocity in the third compartment 220, the third exhaust opening 236 may be smaller than the first exhaust opening 226 of the first compartment 206. Any suitable combination of compartment volumes, exhaust opening diameters, and upstream pressure control can be utilized to control the draw velocity and/or volume requirements for the first, second, and/or third compartments 206, 214, 220.

Figure 3A:
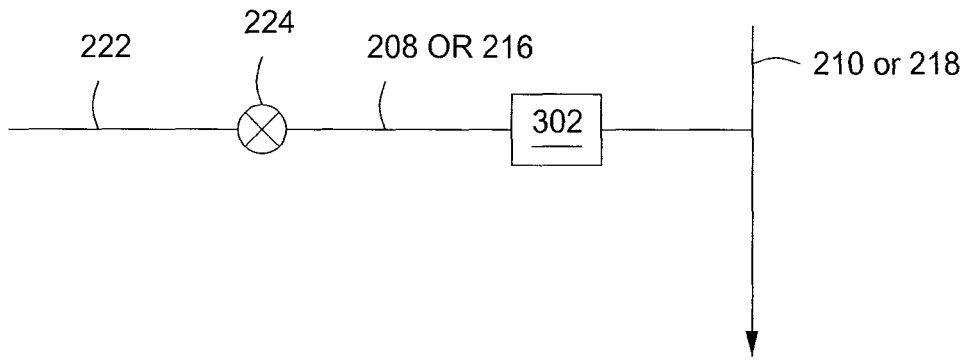
FIGS. 3A-C depict apparatus for chemical species delivery in accordance with some embodiments of the present invention.
Figure 3B:
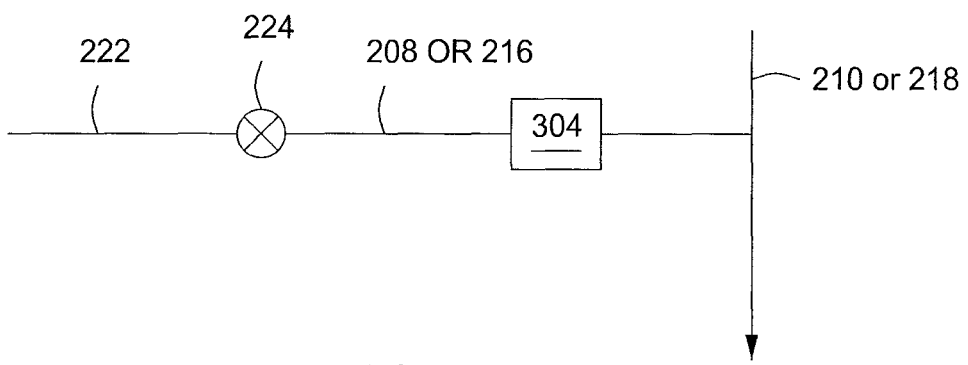
Figure 3C:
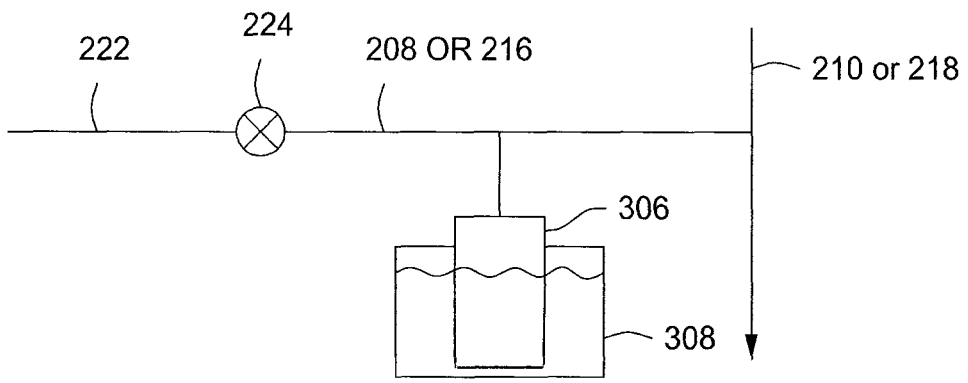

FIGS. 3A-C depict apparatus for chemical species delivery in accordance with some embodiments of the present invention. For example, the apparatus for chemical delivery may include the one or more devices 212 discussed above. For example, as shown in FIG. 3A, the one or more devices 212 may include one or more mass flow controllers 302, wherein each mass flow controller couples one of the pluralities of first or second conduits 208, 216 to the corresponding first or second fluid lines 210, 218. The one or more mass flow controllers can be any suitable type of mass flow controller known in the art and capable of flowing ones of the first or second sets of chemical species disclosed herein.

For example, as shown in FIG. 3B, the one or more devices 212 may include one or more liquid injection apparatus 304, wherein each liquid injection apparatus 304 couples one of the pluralities of first or second conduits 208, 216 to the corresponding first or second fluid lines 210, 218. Each liquid injection apparatus 304 may inject a desired quantity of a liquid of one of the first or second sets of chemical species into the one of the plurality of first or second conduits 208, 216. For example, the liquid may be injected into one of the first or second conduits 208, 216 flowing a carrier gas therethrough. As discussed above, a liquid of one of the first or second sets of chemical species may be disposed in the corresponding compartment 206, 214, or alternatively, provided to the corresponding compartment 206, 214 from an external source, such as a central facilities source, or a liquid chemical species source specifically for use with the process chamber 204.

For example, as shown in FIG. 3C, the one or more devices 212 may include one or more ampoules 306, where each ampoule 306 couples one of the pluralities of first or second conduits 208, 216 to the corresponding first or second fluid line 210, 218. Each ampoule 306 may hold a solid or liquid form of a chemical species that when heated may sublime or vaporize and be swept into the first or second conduit 208, 216 by a carrier gas flowing through the conduit. Each ampoule 306 may be disposed in a heating apparatus 308, where the heating apparatus 308 provides energy to sublime or vaporize a corresponding solid or liquid form of the chemical species. In some embodiments, the heating apparatus 308 may be a heating bath, using a heat transfer medium such as water, oil, sand, or the like. Alternatively or in combination, the heating apparatus 308 may be a heat jacket or the like, which surrounds and heats the ampoule 306, for example using a heat transfer medium, resistive heaters, radiative heat lamps, or the like.

Returning to FIG. 2, the CDS 200 may include a first switching valve 244 disposed between the first fluid line 210 and the process chamber 204. The first switching valve 246 may switch between flowing one or more chemical species from the first set to the process chamber 204 and to the exhaust system 242. Similarly, the CDS 200 may include a second switching valve 246 disposed between the second fluid line 218 and the process chamber 204. The second switching valve 244 may switch between flowing one or more chemical species from the second set to the process chamber 204 and to the exhaust system 242. For example, the first and second switching valves 244, 246 may be utilized for any suitable chemical vapor deposition (CVD), atomic layer deposition (ALD), or similar process performed in the process chamber 204. Further, a process controller (not shown) may be coupled to the first and second fluid lines 210, 218, to facilitate closed loop controlled back pressure, for example, to limit pressure perturbations resultant from switching between the deposition lines flowing to the process chamber 204 and the exhaust lines flowing to the exhaust system 242 via the switching valves 244, 246. In some embodiments, the deposition lines, exhaust lines, and/or fluid lines 210, 218 may be continuously swept (e.g., may have a continuous flow of a non-reactive gas) to limit and/or prevent back streaming of chemical species in a particular line. For example, sweeps of each line may be performed using a non-reactive gas, such as a carrier gas, an inert gas, or the like, such as $H_2$ or other such gases. Gases used for sweeping each line may be provided using any of the apparatus discussed above, such as via ones of the pluralities of first, second, and/or third conduits 208, 216, 222, or alternatively via one or more designated conduits (not shown) coupled to each line which is to be swept.

The CDS 200 may include a first dopant source coupled to the first fluid line 210. The first dopant source 248 may be disposed in the first compartment 206, or alternatively may be routed through the first compartment via one or more conduits (not shown) from external supply source, such as by similar apparatus as discussed above for routing chemical species from the first and second sets from external supply sources. The first dopant source 248 may provide one or more first dopants in liquid or gaseous form to the first fluid line 210. The one or more first dopants may be suitable for doping the material formed by the reaction of Group III elements with Group V elements. Exemplary first dopants may include silane ($SiH_4$), germane ($GeH_4$), or alternative n-dopants.

The CDS 200 may include a second dopant source coupled to the second fluid line 218. The second dopant source 250 may be disposed in the first compartment 206, or alternatively may be routed through the first compartment via one or more conduits (not shown) from external supply source, such as by similar apparatus as discussed above for routing chemical species from the first and second sets from external supply sources. The second dopant source 250 may provide one or more second dopants in liquid or gaseous form to the second fluid line 218. The one or more second dopants may be suitable for doping the material formed by the reaction of Group III elements with Group V elements. Exemplary second dopants may include bromotrichloromethane ($CCl_3Br$) or alternative p-dopants.

The CDS 200 may include an etching gas source coupled to the second fluid line 218. The etching gas source 252 may be disposed in the first compartment 206 or alternatively may be routed through the first compartment via one or more conduits (not shown) from external supply source, such as by similar apparatus as discussed above for routing chemical species from the first and second sets from external supply sources. The etching gas source 252 may provide one or more etching gases to the second fluid line 218. For example, the one or more etching gases may be utilized during any suitable chemical vapor deposition (CVD), atomic layer deposition (ALD), or similar process performed in the process chamber 204, for example such as for selective deposition or the like. Exemplary etching gases may include chlorine ($Cl_2$), hydrogen chloride (HCl), or hydrogen bromide (HBr).

The CDS 200 may include a cleaning gas source 254 coupled to the first and second fluid lines 210, 218. The cleaning gas source 254 may be disposed in the first compartment 206, or alternatively may be routed through the first compartment via one or more conduits (not shown) from external supply source, such as by similar apparatus as discussed above for routing chemical species from the first and second sets from external supply sources. For example, the cleaning gas source may provide a cleaning gas that may be utilized to clean the first and second fluid lines 210, 218, the process chamber 204, or other components of the CDS 200. Exemplary cleaning gases may include chlorine ($Cl_2$), hydrogen chloride (HCl), or nitrogen trifluoride ($NF_3$), or chlorine trifluoride ($ClF_3$).

Embodiments of a chemical delivery system (CDS) have been disclosed herein. The CDS may advantageously meet the desired safety standards required for processing with various toxic and/or non-toxic chemical species while also limiting the total exhaust draw necessary to meet such safety standards.

While the foregoing is directed to embodiments of the present invention, other and further embodiments of the invention may be devised without departing from the basic scope thereof.

The invention claimed is:

1. A chemical delivery system, comprising:
an enclosure;
a first compartment disposed within the enclosure and having a plurality of first conduits to carry a first set of chemical species, the first compartment further having a first draw opening and a first exhaust opening to facilitate flow of a purge gas through the first compartment; and
a second compartment disposed within the enclosure and having a plurality of second conduits to carry a second set of chemical species, the second compartment further having a second draw opening and a second exhaust opening to facilitate flow of the purge gas through the second compartment, wherein the first set of chemical species is different than the second set of chemical species, and wherein a draw velocity of the purge gas through the second compartment is higher than the draw velocity of the purge gas through the first compartment.

2. The chemical delivery system of claim 1, wherein the second exhaust opening has a smaller cross sectional area than the first exhaust opening.

3. The chemical delivery system of claim 1, wherein the enclosure further comprises:
a third compartment to receive at least some chemical species for the first or the second sets from a location external to the enclosure and having at least some of the plurality of first and second conduits originating in the third compartment to carry the at least some chemical species respectively to the first and second compartments.

4. The chemical delivery system of claim 3, wherein the third compartment further comprises:
a third draw opening and a third exhaust opening to facilitate flow of the purge gas through the third compartment, wherein a draw velocity of the purge gas through the third compartment is greater than the draw velocity of the purge gas through the first compartment.

5. The chemical delivery system of claim 3, wherein third exhaust opening of the third compartment is coupled to the second exhaust opening of the second compartment to provide a common upstream pressure to both the second compartment and the third compartment.

6. The chemical delivery system of claim 3, wherein at least some of the first set of chemical species comprise Group III elements and wherein at least some of the second set of chemical species comprise Group V elements.

7. The chemical delivery system of claim 3, wherein at least some of the first set of chemical species comprise Group III elements and no Group V elements, and wherein at least some of the second set of chemical species comprise Group V elements and no Group III elements.

8. The chemical delivery system of claim 3, the third compartment further comprising:
a plurality of joints disposed in the third compartment; wherein each joint couples one of a plurality of third conduits to a corresponding one of the plurality of first and second conduits and wherein each third conduit enters the enclosure from an external location and carries a chemical species from at least one of the first or second sets of chemical species.

9. The chemical delivery system of claim 8, further comprising:
a first fluid line to couple each of the plurality of first conduits to a process chamber; and
a second fluid line to couple each of the plurality of second conduits to the process chamber.

10. The chemical delivery system of claim 9, further comprising:
a first switching valve disposed between the first fluid line and the process chamber; and
a second switching valve disposed between the second fluid line and the process chamber, wherein the first and second switching valves switch between flowing one or more chemical species from the respective first and second sets of chemical species to the process chamber and to an exhaust system.

11. The chemical delivery system of claim 9, further comprising:
a plurality of mass flow controllers, wherein each mass flow controller couples one of the pluralities of first or second conduits to the corresponding first or second fluid lines.

12. The chemical delivery system of claim 9, further comprising:
a plurality of liquid injection apparatus, wherein each liquid injection apparatus couples one of the pluralities of first or second conduits to the corresponding first or second fluid lines.

13. The chemical delivery system of claim 9, further comprising:
an ampoule coupled between one of the pluralities of first or second conduits and a corresponding first or second fluid lines.

14. The chemical delivery system of claim 13, wherein the ampoule holds a solid or liquid form of a chemical species and wherein a gas provided by the first or second conduit coupled to the ampoule is a carrier gas.

15. The chemical delivery system of claim 14, wherein the ampoule is disposed in a heating apparatus to sublime or vaporize a corresponding solid or liquid form of the chemical species and wherein the sublimed or vaporized chemical species from the ampoule can be carried into the correspond first or second conduit via the carrier gas.

16. The chemical delivery system of claim 15, wherein the heating apparatus comprises a heating bath.

17. The chemical delivery system of claim 9, further comprising:
a first dopant source coupled to the first fluid line; and
a second dopant source coupled to the second fluid line, wherein the first and second dopant sources are disposed in the first compartment.

18. The chemical delivery system of claim 9, further comprising:
an etching gas source coupled to the second fluid line, wherein the etching gas source is disposed in the first compartment.

19. The chemical delivery system of claim 9, further comprising:
a cleaning gas source coupled to the first and the second fluid lines, wherein the cleaning gas source is disposed in the first compartment.

20. A chemical delivery system, comprising:
an enclosure;
a first compartment disposed within the enclosure and having a plurality of first conduits to carry a first set of chemical species, the first compartment further having a first draw opening and a first exhaust opening to facilitate flow of a purge gas through the first compartment;
a second compartment disposed within the enclosure and having a plurality of second conduits to carry a second set of chemical species, the second compartment further having a second draw opening and a second exhaust opening to facilitate flow of the purge gas through the second compartment, wherein the first set of chemical species is different than the second set of chemical species; and
a third compartment disposed within the enclosure and having at least some of the plurality of first conduits and at least some of the plurality of second conduits originating in the third compartment and having a fitting to couple at least some first and second conduits to an external supply of at least some of the chemical species from the first and second sets, wherein the third compartment further includes a third draw opening and a third exhaust opening to facilitate flow of the purge gas through the third compartment, and wherein draw velocities of the purge gas through the second compartment and the third compartment are higher than the draw velocity of the purge gas through the first compartment.

* * * * *